United States Patent Office 3,787,431
Patented Jan. 22, 1974

3,787,431
CERTAIN 3,4,5-TRIPHENYLTHIAZOL-2-ONES
Siegfried Linke, Rudiger Sitt, Harald Horstmann, and Karl Meng, Wuppertal-Elberfeld, Germany, assignors to Bayer Aktiengesellschaft, Leverkusen, Germany
No Drawing. Filed Oct. 12, 1971, Ser. No. 188,533
Claims priority, application Germany, Oct. 14, 1970, P 20 50 439.6
Int. Cl. C07d 91/24
U.S. Cl. 260—306.7            29 Claims

ABSTRACT OF THE DISCLOSURE 4,5-diphenylthiazolones-(2) bearing an unsubstituted or substituted aryl group in the 3-position are prepared from the reaction of a desyl halide and an N-arylthiocarbamic acid O-ester. The compounds, of which 3-(4-nitrophenyl)-4,5-diphenylthiazolone-(2) is a representative embodiment, are hypolipemic agents.

DETAILED DESCRIPTION

The present invention relates to new thiazolone-(2) derivatives, to processes for their preparation and their use in the treatment of hyperlipemic conditions.

Compounds possessing a hypolipemic action, especially hypocholesterolemic action are known. Many of these however possess disadvantages which impose limitations on their use. For example, 2-(p-chlorophenyl)-1-[p-(β-diethylaminoethoxy)phenyl]-1-(p-tolyl)ethanol (Triparanol) causes an accumulation of desmosterol, an undesired intermediate product of cholesterol. Ethyl-α-(p-chlorophenoxy)isobutyrate (Clofibrate) is employed for the treatment of hyperlipemic conditions but must be used in high doses.

The present invention provides new thiazolones of the formula:

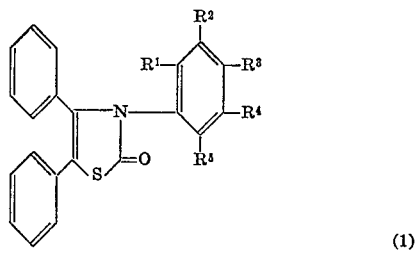

(1)

in which $R^1$ to $R^5$ are the same or different and are each a hydrogen, halogeno, hydroxy, amino, straight- or branched-chain alkyl, cycloalkyl or cycloalkenyl optionally substituted by one or more halogeno atoms or lower alkoxy groups, a carbocyclic aromatic radical with 6 or 10 ring carbon atoms, a heterocyclic aromatic radical with 5 or 6 ring members optionally substituted by one or more halogen atoms, lower alkyl or lower alkoxy groups, trifluoromethyl, nitrile, nitro, sulfonamido optionally substituted on the nitrogen atom by one or more lower alkyl groups, di(lower alkyl)amino, lower alkoxy, lower aroxy, lower alkylmercapto, lower arylmercapto, lower alkylcarbonyl, arylcarbonyl, lower alkylsulfonyl, arylsulfonyl, acyloxy, acylthio, lower alkylcarbonylamino optionally substituted on the nitrogen atom by one or more lower alkyl groups, carbo(lower alkoxy), or carbaryloxy. In addition, any two adjacent groups of $R^1$ to $R^5$ can together with the carbon atoms to which they are attached constitute a fused aliphatic, aromatic or heterocyclic ring system, the remaining members of $R^1$ to $R^5$ being as defined above.

Finally the percent invention embraces bis(4,5-diphenylthiazol-2-on-3-yl) compounds wherein the two groups are joined to a phenyl or a biphenyl ring having in addition in the case of phenyl up to four substituents and in the case of biphenyl up to eight substituents of the type set forth above for $R^1$ through $R^5$. In this embodiment one of $R^1$ through $R^5$ is thus a 4,5-diphenylthiazol-2-on-3-yl or 4,5-diphenylthiazol-2-on-3-ylphenyl group, the phenyl portion of the latter being optionally substituted by up to four substituents, the remainder of $R^1$ through $R^5$ being as defined above.

The term "lower alkyl" denotes a straight- or branched-chain monovalent hydrocarbon group of from 1 to 6 carbon atoms; e.g. methyl, ethyl, n-propyl, isopropyl, n-butyl, isobutyl, sec.butyl, tert.-butyl, n-pentyl, neopentyl, n-hexyl, etc. The term "lower alkoxy" refers to a lower alkyl group bound to the remainder of the molecule through an oxygen ether group; e.g. methoxy, ethoxy, n-propoxy, isopropoxy, butoxy and the like, while "lower alkylthio" refers to a lower alkyl group bound to the remainder of the molecule through a sulfur atom.

The term cycloalkyl refers to a monovalent saturated cyclic hydrocarbon of from 5 to 7 carbon atoms such as cyclopentyl, cyclohexyl or cycloheptyl while cycloalkenyl refers to the corresponding cyclic hydrocarbons bearing ethylenic unsaturation.

The term "halogeno" denotes fluoro, chloro, bromo and iodo.

The term "aryl" denotes an aromatic carbocyclic ring of 6 or 10 carbon atoms and specifically includes such systems whether unsubstituted or substituted by a substituent such as halogeno, trifluoromethyl, lower alkyl, lower alkoxy or lower alkylthio. The preferred aryl group is phenyl, either unsubstituted or substituted by chloro, bromo, or lower alkoxy.

Of the foregoing compounds, a preferred group are those of Formula 1 wherein $R^1$, $R^2$, $R^3$, $R^4$ and $R^5$, when taken independently of each other are each hydrogen, halogeno, hydroxy, trifluoromethyl, cyano, nitro, lower alkyl, lower alkoxy, lower alkylthio, cycloalkyl, cycloalkenyl, di(lower alkyl)amino, lower alkylcarbenzyl, lower alkylcarbenzylamino, lower alkylsulfonyl or carbo (lower alkoxy), or any two of $R^1$, $R^2$, $R^3$, $R^4$ or $R^5$ on adjacent carbon atoms taken together with the carbon atoms to which they are attached, are cycloalkyl.

The present invention also provides a novel process for the preparation of the compounds of Formula 1 in which an α-halodesoxybenzoin, hereafter referred to as a desyl halide, of the formula:

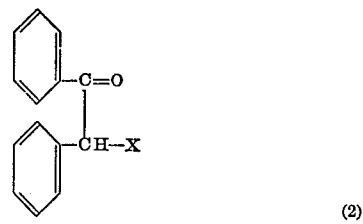

(2)

in which X is chloro, bromo or iodo, is allowed to react with a phenylthiocarbamic acid O-ester of the formula:

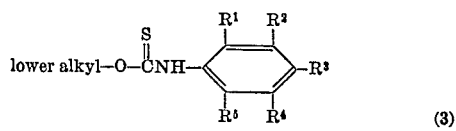

(3)

in which $R^1$, $R^2$, $R^3$, $R^4$ and $R^5$ are as defined above.

The phenylthiocarbamic acid O-ester may be employed as such in which case the reaction can be executed either without a solvent or in the presence of an inert organic solvent such as an alkanol, hydrocarbon, chlorinated hydrocarbon, glacial acetic acid, ether and the like. Alternatively the phenylthiocarbamic acid O-ester can be generated in situ through utilization of a phenylisothiocyanate of the formula:

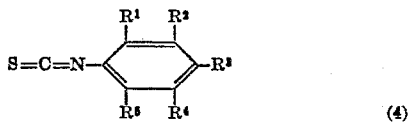

and a lower alkanol, optionally in the presence of an additional solvent.

Utilizing p-nitrophenylisothiocyanate ethanol and desyl bromide as representative reactants, the reaction may thus be typified as follows:

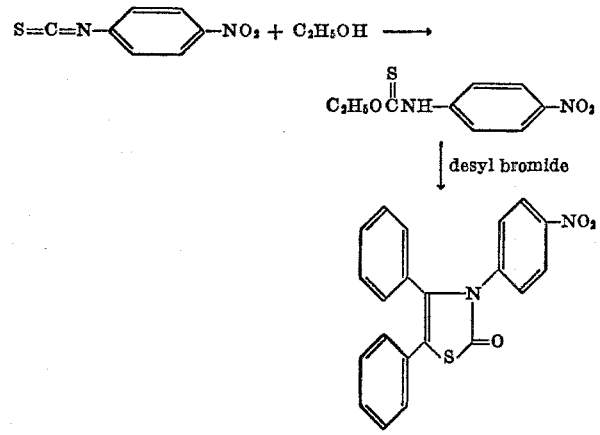

The reaction is generally performed at atmospheric pressure, although superatmospheric pressure as in an autoclave can be employed, and at temperatures of from about 0° to about 300° C., preferably from about 100° to about 200° C., utilizing approximately molar amounts of reactants. When a bis(4,5-diphenylthiazol-2-on-3-yl) derivative is prepared, two moles of desyl halide and two moles of a lower alkanol are allowed to react with a diisothiocyanate. Thus for example, two moles of desyl bromide, one mole of 1,4-diisothiocyanobenzene and two moles of ethanol yields 1,4-bis(4,5-diphenylthiazol-2-on-3-yl)benzene while use of one mole of 4,4'-diisothiocyanobiphenyl yields 4,4'-bis(4,5-diphenylthiazol-2-on-3-yl)biphenyl.

The desyl halides of Formula 2 are known or can be readily prepared by known methods; see e.g., Org. Synth. Coll., II, 159 (1943) and Org. React., IV, 259 (1948). Similarly, the N-phenylthiocarbamic acid O-esters of Formula 3 and the corresponding isothiocyanates of Formula 4 are known or prepared by known methods; see e.g., Houben-Weyl, Methoden der Organischen Chemie, vol. 9 (1955), pages 832 and 867–884. Representative of suitable phenylthiocarbamic acid esters include:

N-phenylthiocarbamic acid O-ethyl ester,
N-(2-tolyl)-thiocarbamic acid O-ethyl ester,
N-(4-tolyl)-thiocarbamic acid O-methyl ester,
N-(4-tert.-butylphenyl)-thiocarbamic acid O-ethyl ester,
N-[β-(5,6,7,8-tetrahydronaphthyl)]-thiocarbamic acid O-ethyl ester,
N-(4-cyclohexylphenyl)-thiocarbamic acid O-ethyl ester,
N-(4-cyclohexen-1'-yl-phenyl)-thiocarbamic acid O-ethyl ester,
N-(2,4,5-trimethylphenyl)-thiocarbamic acid O-ethyl ester,
N-(2,3,4-trimethylphenyl)-thiocarbamic acid O-n-propyl ester,
N-(2-methyl-4-cyclohexylphenyl)-thiocarbamic acid O-ethyl ester,
N-(2-isopropyl-phenyl)-thiocarbamic acid O-benzyl ester,
N-(4-bromophenyl)-thiocarbamic acid O-ethyl ester,
N-(3-chloro-4-trifluoromethyl-phenyl)-thiocarbamic acid O-ethyl ester,
N-(2-methyl-5-chlorophenyl)-thiocarbamic acid O-methyl ester,
N-(2-methyl-4,5-dichlorophenyl)-thiocarbamic acid O-ethyl ester,
N-(3,4-dicyanophenyl)-thiocarbamic acid O-ethyl ester,
N-(3-nitrophenyl)-thiocarbamic acid O-ethyl ester,
N-(4-nitrophenyl)-thiocarbamic acid O-ethyl ester,
N-(2-methyl-5-nitrophenyl)-thiocarbamic acid O-ethyl ester,
N-(2-methyl-4-nitro-4-chlorophenyl)-thiocarbamic acid O-ethyl ester,
N-(2,4-dimethyl-5-nitrophenyl)-thiocarbamic acid O-methyl ester,
N-(4-dimethylaminophenyl)-thiocarbamic acid O-ethyl ester,
N-(2-methyl-4-dimethylamino-phenyl)-thiocarbamic acid O-ethyl ester,
N-(3-methoxyphenyl)-thiocarbamic acid O-ethyl ester,
N-(4-methoxyphenyl)-thiocarbamic acid O-ethyl ester,
N-(4-ethoxyphenyl)-thiocarbamic acid O-n-propyl ester,
N-(3-methoxy-4-methylphenyl)-thiocarbamic acid O-ethyl ester,
N-(3-methyl-4-n-hexyloxyphenyl)-thiocarbamic acid O-ethyl ester,
N-(2-methoxy-5-nitrophenyl)-thiocarbamic acid O-propyl ester,
N-(3-ethoxyphenyl)-thiocarbamic acid O-ethyl ester,
N-(3-nitro-4-ethoxyphenyl)-thiocarbamic acid O-n-butyl ester,
N-(2,5-dimethoxy-4-nitro-phenyl)-thiocarbamic acid O-ethyl ester,
N-(4-methylmercapto-phenyl)-thiocarbamic acid O-ethyl ester,
N-(4-phenylmercapto-phenyl)-thiocarbamic acid O-ethyl ester,
N-(4-n-hexylmercapto-phenyl)-thiocarbamic acid O-ethyl ester,
N-(4-methylsulphonyl-phenyl)-thiocarbamic acid O-ethyl ester,
N-(4-phenylsulphonyl-phenyl)-thiocarbamic acid O-ethyl ester,
N-(2-methoxy-5-methyl-sulphonyl)-thiocarbamic acid O-propyl ester,
N-(4-ethoxycarbonyl-phenyl)-thiocarbamic acid O-ethyl ester,
N-(4-acetylphenyl)-thiocarbamic acid O-ethyl ester,
N-(4-benzoylphenyl)-thiocarbamic acid O-ethyl ester,
N-(3-acetylaminophenyl)-thiocarbamic acid O-ethyl ester and
N-(4-benzoylaminophenyl)-thiocarbamic acid O-ethyl ester.

Representative of suitable phenylisothiocyanates include:

phenylisothiocyanate,
3-trifluoromethylphenylisothiocyanate,
3,5-di-trifluoromethylphenylisothiocyanate,
2,5-dimethylphenylisothiocyanate,
(5,6,7,8-tetrahydronaphthyl)-α-isothiocyanate,
2-methyl-5-chlorophenylisothiocyanate,
2-methyl-4,5-dichlorophenylisothiocyanate,
2-methyl-4-nitrophenylisothiocyanate,
4-benzoylphenylisothiocyanate,
4-ethoxyphenylisothiocyanate,
4-phenyloxyphenylisothiocyanate,
2-methyl-4-methoxyphenylisothiocyanate,
2-methoxy-4-chloro-5-methylphenylisothiocyanate,
2-methoxy-5-nitrophenylisothiocyanate,
diphenyl-4,4'-diisothiocyanate,
phenyl-1,4-diisothiocyanate,
4-(n-hexylmercapto)-phenylisothiocyanate,
4-phenylmercaptophenylisothiocyanate,
4-butyryl-phenylisothiocyanate,
4-acetylphenylisothiocyanate,
2-methoxy-4-nitro-5-chlorophenylisothiocyanate, 2,4-dimethoxy-5-chlorophenylisothiocyanate,
4-phenylsulphonylphenylisothiocyanate,
2-methyl-4-acetylaminophenylisothiocyanate,
3-methoxy-4-acetylaminophenylisothiocyanate,
4-methyl-5-anilinosulphophenylisothiocyanate,
2,3-dioxymethylenephenylisothiocyanate,
3-anilinosulphophenylisothiocyanate,
4-hydroxyphenylisothiocyanate, and
4-aminophenylisothiocyanate.

Surprisingly, the thiazolones according to the invention show a considerably high hypocholesterolaemic action without an increase in the formation of undesired intermediate biosynthetic products of cholesterol. This activity of these new thiazolones can be seen from a comparision with ethyl-α-(p-chlorophenoxy)isobutyrate (Clofibrate) in which the substances were administered orally to rats twice daily on two successive days. The cholesterol in the serum was determined two hours after the last administration, according to a modification of the method of Watson, Clin. Chim. Acta 5, 637 (1960). 3-(p-nitrophenyl)-4,5-diphenylthiazolone-(2) at a daily dose as low as 20 mg./kg. effected a lowering of serum cholesterol concentration by about 30% while 3,4,5-triphenylthiazolone-(2) lowered the cholesterol concentration in the serum by 30 to 40% at a daily dose as low as 20 mg./kg. The corresponding effective daily dose of ethyl-α-(p-chlorophenoxyisobutyrate is about 200 mg./kg. and at a daily dose of 20 mg./kg., no distinguishable action on serum cholesterol concentration is detectable.

Upon treatment with compounds of the present invention at doses as high as 300 mg./kg., no desmosterol was detectable in the liver of rats after six days' oral administration. In contrast, an accumulation of desmosterol in this organ is observed under similar treatment with Triparanol.

The general dosage rate is from about 20 to about 100 mg./kg. body weight. The actual dose will depend on the individual's reaction to the treatment and on the severity of the condition under treatment.

Administration is preferably performed through utilization of a pharmaceutical composition adapted for oral administration containing at least one of thiazolones of Formula 1 in admixture with a pharmaceutically acceptable solid or liquid diluent or carrier as hereinafter defined. In the present specification the expression "pharmaceutically acceptable diluent or carrier" refers to a non-toxic substance that when mixed with the active ingredient or ingredients rends it suitable for or facilitates administration. Examples of suitable liquid diluents and carriers are vegetable oils, polyols, buffered aqueous solutions, isotonic saline aqueous solutions and syrups. Examples of suitable solid diluents and carriers are starches, cellulose and its derivatives, sugars, stearates and stearic acid, and talc. Examples of pharmaceutical compositions according to the invention are solutions, aqueous suspensions, elixirs, syrups, capsules, granules and powders, either free-flowing or compressed into tablets. The diluents and carriers used for oral administration include glucose, lactose, sucrose, corn starch and potato starch, sodium carboxymethyl cellulose, ethyl cellulose, cellulose acetate, powdered gum tragacanth, gelatin, alginic acid, agar, talc, stearic acid, sodium, calcium and magnesium stearates, sodium lauryl sulfate, polyvinylpyrollidone, sodium citrate, calcium carbonate, dicalcium phosphate and the like, as well as the other non-toxic adjuvants and modifiers such as dyes, surfactants, perfumes, flavoring agents and preservatives.

The compositions are preferable in dosage unit form with at least one thiazolone of Formula 1 being administered either alone or in admixture with a pharmaceutically acceptable carrier as defined above. The expression "dosage unit form" as used in the present specification refers to a medicament in the form of discrete portions each containing a unit dose or a multiple or sub-multiple of a unit dose of the active ingredient, as for example, one, two, three or four unit doses or a half, a third or a quarter of a unit dose. A "unit dose" is the amount of the active ingredient to be administered on one occasion and will usually be a daily dose, or for example a half, a third, or a quarter of a daily dose depending upon the regimen on which the medicament is administered, once, twice, three times, or four times a day.

The discrete portions constituting the medicament in dosage unit form can include a protective envelope. The active ingredient can be undiluted in such an envelope, or can be mixed with a pharmaceutically acceptable solid or liquid carrier as defined above. Such portions can for example be in monolithic coherent form, such as tablets, lozenges, pills, suppositories, or drageés; in wrapped or concealed form, the active ingredients being within a protective envelope, such as wrapped powders, cachets, sachets, capsules, or ampoules; or in the form of a sterile solution suitable for parenteral injection, such as ampoules of buffered, isotonic sterile, pyrogen-free aqueous solution; or in any other form known in the art.

As stated above, it is preferred to administer the new thiazolones of Formula 1 perorally. Preferred medicaments in dosage unit form according to the invention are therefore those adapted for oral administration, such as tablets, pills, drageés, capsules, and cachets, as well as wrapped powders containing the active ingredient in powdered form with a powdered diluent or carrier for suspension in water before being taken. The preferred unit dose for administration of the medicaments of the invention will contain from 1000 to 9000 mg. of active ingredient.

The invention finally provides a method of treating hyperlipemia in animals which comprises administering thereto a thiazolone of Formula 1 alone or in a pharmaceutical composition in dosage unit form according to the invention.

The following examples will serve to further illustrate the present invention without being a limitation on the scope thereof.

EXAMPLE 1

57.2 g. of desyl chloride and 45.3 g. of N-phenylthiocarbamic acid O-ethyl ester are intimately mixed and then heated to approximately 160° C. for 5 hours. After cooling, the mixture is triturated with methanol and the product is filtered off. 3,4,5-triphenylthiazolone-(2) can be recrystallized from n-butanol and then melts at 190° C.

EXAMPLE 2

A mixture of 23.2 g. of desyl chloride (alternatively named as α-chloro-desoxybenzoin) and 19.5 g. of N-(p-tolyl)-thiocarbamic acid O-ethyl ester is heated for 5 hours to 150 C. and then cooled. The solid product is recrystallized from acetonitrile. 3-(p-tolyl)-4,5-diphenylthiazolone-(2) melts at 206° C.

EXAMPLE 3

23.5 g. of desyl chloride and 19.5 g. of N-(o-tolyl)-thiocarbamic acid O-ethyl ester are heated for 6 hours to 150° C. After cooling, an oil is obtained which is boiled with ligroin. After prolonged standing in a refrigerator, 3-(o-tolyl)-4,5-diphenylthiazolone-(2) crystallizes out; melting point 136° C. to 138° C.

EXAMPLE 4

23.7 g. of N - (p - tert. - butylphenyl) - carbamic acid O-ethyl ester and 23.2 g. of desyl chloride are heated for 5 hours to 140° C. The cooled solid residue is recrystallized from toluene. 3-(p-tert.-butylphenyl)-4,5-diphenylthiazolone-(2) is thus obtained as a crystalline product of melting point 245 to 247° C.

EXAMPLE 5

23.5 g. of N-[β-(5,6,7,8-tetrahydronaphthyl)]-thiocarbamic acid -ethyl ester are mixed with 23.2 g. of desyl chloride. This mixture is heated to 150° C. for 5 hours.

After cooling, the product is boiled with ligroin. 3-[β-(5',6',7',8' - tetrahydronaphthyl)] - 4,5 - diphenylthiazolone-(2) crystallizes from the ligroin; melting point 155° C. to 156° C.

EXAMPLE 6

23.2 g. of desyl chloride and 26.1 g. of N-(p-cyclohexylphenyl)-thiacarbamic acid O-ethyl are heated to 150° C. for 6 hours and then cooled, and the product is recrystallized from ligroin. The 3-(p-cyclohexylphenyl)-4,5-diphenylthiazolone-(2) thus obtained melts at 176° C. to 177° C.

EXAMPLE 7

15 g. of N-(p-cyclohexen - 1 - yl-phenyl)-thiocarbamic acid O-ethyl ester and 13.3 g. of desyl chloride are heated for 5 hours and then cooled. The smeary residue is boiled with ligroin, from which 3-(p-cyclohexen-1'-yl-phenyl)-4,5-diphenylthiazolone-(2) crystallizes, melting point 205° C. to 206° C.

EXAMPLE 8

17.3 g. of desyl chloride and 17 g. of N-(p-nitrophenyl)-thiocarbamic acid O-ethyl ester are heated to 150° C. for 5 hours. After cooling, the product is recrystallized from ligroin and carbon tetrachloride. 3-(p-nitrophenyl)-4,5-diphenyl-thiazolone-(2) melts at 143° C. to 146° C.

EXAMPLE 9

29.4 g. of N-(m-nitrophenyl)-thiocarbamic acid O-ethyl ester and 30 g. of desyl chloride are heated at approximately 130° C. for 6 hours. The mixture is then cooled and triturated with alcohol and 3-(m-nitrophenyl)-4,5-diphenylthiazolone-(2) is filtered off and recrystallized from acetonitrile. Melting point 209° C. to 211° C.

EXAMPLE 10

24.9 g. of N-(m-trifluoromethylphenyl)-thiocarbamic acid O-ethyl ester mixed with 23.2 g. of desyl chloride are heated to approximately 150° C. for 5 hours. The residue, which is solid after cooling, is recrystallized from ligroin. 3-(m-trifluoromethylphenyl) - 4,5 - diphenylthiazolone-(2) melts at 148° C. to 149° C.

EXAMPLE 11

21.1 g. of N-(p-methoxyphenyl)-thiocarbamic acid O-ethyl ester and 23.2 g. of desyl chloride are heated to 140° C. for 3 hours. The reaction product is recrystallized from carbon tetrachloride and 3-(p-methoxyphenyl)-4,5-diphenylthiazolone-(2), melting point 182° C. to 183° C., is obtained.

EXAMPLE 12

30 g. of N-(m-methoxyphenyl)-thiocarbamic acid O-ethyl ester and 32.7 g. of desyl chloride are mixed and the mixture is warmed to 130° C. for 3 hours. After cooling, it is boiled with ligroin. 3-(m-methoxyphenyl)-4,5-diphenylthiazolone crystallizes from the ligroin and is recrystallized once from cyclohexane. Melting point 141° C. to 143° C.

EXAMPLE 13

A mixture of 22.7 g. of N-(p-methylthiophenyl)-thiocarbamic acid O-ethyl ester and 23.2 g. of desyl chloride is heated to 140° C. for 3 hours. After cooling, the product is boiled with ligroin. After recrystallization from ligroin, 3-(p - methylthiophenyl)-4,5-diphenylthiazolone-(2), melting point 164° C. to 168° C., is obtained.

EXAMPLE 14

16.1 g. of desyl chloride, mixed with 13 g. of N-(p-dimethylaminophenyl)-thiocarbamic acid O-ethyl ester, are heated to 150° C. for 3 hours. After cooling, a syrup is obtained, which is taken up in chloroform. This solution is extracted by shaking with sodium bicarbonate solution, washed with water, and dried (Na₂SO₄). After the chloroform has been stripped off and the residue triturated with ligroin, crystals of 3-(p-dimethylaminophenyl)-4,5-diphenylthiazolone-(2) are obtained, which are recrystallized from a little toluene and then melt at 198° C. to 201° C.

EXAMPLE 15

Mixing 23.2 g. of desyl chloride with 22.3 g. of N-(p-acetylphenyl)-thiocarbamic acid O-ethyl ester and heating to 150° C. for 5 hours yields a resinous product. This is boiled with ligroin. On standing, 3-(p-acetylphenyl)-4,5-diphenylthiazolone-(2), melting point 154° C. to 156° C., crystallizes from the ligroin.

EXAMPLE 16

30 g. of N-(p-methylsulphonylphenyl)-thiocarbamic acid O-ethyl ester and 27 g. of desyl chloride are heated to 140° C. for 2½ hours. After cooling, the product is recrystallized from acetonitrile. 3-(p-methylsulphonylphenyl-4,5-diphenylthiazolone-(2), thus obtained, melts at 246° C.

EXAMPLE 17

23.9 g. of N-(p-ethoxycarbonylphenyl)-thiocarbamic acid O-ethyl ester and 23.2 g. of desyl chloride are heated to 150° C. for 2 hours after which the mixture is cooled and boiled with ligroin. 3-(p-ethoxycarbonylphenyl)-4,5-diphenylthiazolone-(2) crystallizes from the ligroin and melts at 177° C. after recrystallization from ligroin.

EXAMPLE 18

16 g. of N-(3,4-dichlorophenyl)-thiocarbamic acid O-ethyl ester and 14 g. of desyl chloride are heated to 150° C. for 3 hours. The mixture is cooled and recrystallized from acetonitrile, and 3 - (3',4' - dichlorophenyl)-4,5-diphenylthiazolone-(2), melting point 198° C., is thus obtained.

EXAMPLE 19

After heating 23.2 g. of desyl chloride with 28.4 g. of N-(3-chloro-4-trifluoromethylphenyl) - thiocarbamic acid O-ethyl ester to 140° C. for 4 hours, the mixture is cooled and the oil thus obtained is repeatedly boiled with ligroin. After prolonged standing, 3-(3'-chloro-4-trifluoromethylphenyl)-4,5-diphenylthiazolone-(2), melting point 163° C., crystallizes out.

EXAMPLE 20

23.1 g. of N-(3,4-dicyanophenyl)-thiocarbamic acid O-ethyl ester and 23.2 g. of desyl chloride are heated to 150° C. for 3 hours. After cooling and recrystallizing from acetonitrile, 3-(3',4' - dicyanophenyl)-4,5-diphenylthiazolone-(2) of melting point 258° C. to 261° C. is obtained.

EXAMPLE 21

22.5 g. of N-(3-methoxy-4-methylphenyl)-thiocarbamic acid O-ethyl ester and 23.2 g. of desyl chloride are heated to 160° C. for 2 hours. After cooling, the product is recrystallized from ligroin. 3-(3'-methoxy-4-methyl-phenyl)-4,5-diphenylthiazolone-(2) has a melting point of 171° C. to 173° C.

EXAMPLE 22

23.2 g. of desyl chloride and 22.3 g. of N-(2,4,5-trimethylphenyl)-thiocarbamic acid O-ethyl ester are heated to 150° C. for 3 hours. The mixture is cooled and boiled with ligroin. 3-(2',4',5'-trimethylphenyl) - 4,5 - diphenylthiazolone of melting point 136° C. separates out from the ligroin.

EXAMPLE 23

23.2 g. of desyl chloride and 21.8 g. of N-(2-methyl-3,4-dichlorophenyl)-isothiocyanate in 100 ml. of n-butanol are boiled for 15 hours under reflux. After stripping off the solvent, the residue is boiled with ligroin. 3-(2'-methyl-3',4'-dichlorophenyl)-4,5-diphenylthiazolone - (2) crystallizes from the ligroin and then melts at 167° C. to 168° C.

EXAMPLE 24

50 g. of phenylisothiocyanate and 86 g. of desyl chloride in 700 ml. of ethyl alcohol are heated to 150° C. in an autoclave for 6 hours. After stripping off the alcohol, the residue is boiled with 1:1 ligroin/benzene. On cooling, 3,4,5-triphenylthiazolone crystallizes out; melting point 193° C.

EXAMPLE 25

5.7 g. of N-(m-nitrophenyl)-thiocarbamic acid O-ethyl ester and 5.8 g. of desyl chloride in 75 ml. of n-butanol are boiled overnight under reflux. After stipping off the solvent, the residue is taken up in hot acetonitrile and filtered. On cooling, 3-(m-nitrophenyl)-4,5-diphenylthiazolone-(2), melting point 210° C., crystallizes out.

EXAMPLE 26

5.8 g. of desyl chloride and 4.9 g. of N-(p-tolyl)-thiocarbamic acid O-ethyl ester in 75 ml. of glacial acetic acid are boiled overnight under reflux. The solvent is stripped off in vacuo and the residue is recrystallized from acetonitrile. 3 - (p-tolyl)-4,5-diphenylthiazolone-(2), thus obtained, melts at 207° C.

EXAMPLE 27

5.9 g. of N-(p-tert.-butylphenyl)-thiocarbamic acid O-ethyl ester and 5.8 g. of desyl chloride in 75 ml. of toluene are boiled under reflux. On cooling, 3-(p-tert.-butylphenyl)-4,5-diphenylthiazolone-(2) crystallizes out. After recrystallization from acetonitrile, it has a melting point of 242° C.

EXAMPLE 28

23.1 g. of desyl chloride and 13.5 g. of phenylisothiocyanate in 100 ml. of n-butanol are boiled overnight under reflux. On cooling, 3,4,5-triphenylthiazolone-(2), melting point 192° C., crystallizes out.

EXAMPLE 29

5.5 g. of desyl bromide and 4.5 g. of N-(2,4,5-trimethylphenyl)-thiocarbamic acid O-ethyl ester in 70 ml. of xylene are boiled overnight under reflux. After stripping off the solvent, the residue is boiled with ligroin. After two recrystallizations, 3-(2',4',5'-trimethylphenyl)-4,5-diphenylthiazolone-(2), having a melting point of 132° C. to 136° C., is obtained.

EXAMPLE 30

4.2 g. of N-(p-methoxyphenyl)-thiocarbamic acid O-ethyl ester and 5.5 g. of desyl bromide are heated to 100° C. for 2 hours. On cooling, the reaction product solidifies. After recrystallization from carbon tetrachloride, 3-(p-methoxyphenyl)-4,5-diphenylthiazolone-(2) is obtained, melting point 178° C. to 182° C.

EXAMPLE 31

15 g. of N-(4-hydroxyphenyl)-thiocarbamic acid O-ethyl ester and 20.8 g. of desyl bromide are intimately mixed and slowly heated to 150° C. This temperature is maintained for 5 hours; cooling is effected, followed by recrystallization from acetonitrile. There are obtained 13 g. (70%) 3-(p-hydroxyphenyl)-4,5-diphenylthiazolone-(2), melting point 270° C. to 272° C.

EXAMPLE 32

After 6 hours' heating of 24 g. of N-(2-methyl-5-acetaminophenyl)-thiocarbamic acid O-ethyl ester with 26.1 g. of desyl bromide, cooling of the reaction product and recrystallization from acetonitrile, there are obtained 26 g. (65%) 3 - (2' - methyl-5'-acetaminophenyl)-4,5-diphenylthiazolone, melting point 258° to 259° C.

Analogously, from 24 g. of desyl bromide with 19.5 g. of N-(2-methyl - 4 - methoxyphenyl)-thiocarbamic acid O-ethyl ester there are obtained 21 g. (64%) 2-(2'-methyl - 4' - methoxyphenyl)-4,5-diphenylthiazolone, melting point 187° C. to 189° C.

What is claimed is:

1. A compound of the formula:

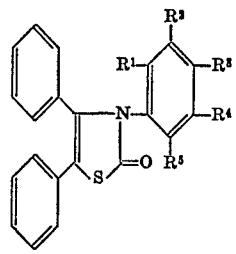

wherein $R^1$, $R^2$, $R^3$, $R^4$ and $R^5$, when taken independently of each other are each hydrogen, halogeno, hydroxy, trifluoromethyl, cyano, nitro, lower alkyl, lower alkoxy, lower alkylthio, cycloalkyl of 5 to 7 carbon atoms, cycloalkenyl of 5 to 7 carbon atoms, di(lower alkyl)amino, lower alkylcarbonyl, lower alkylcarbonylamino, lower alkylsulfonyl or carbo(lower alkoxy), or any two of $R^1$, $R^2$, $R^3$, $R^4$ or $R^5$ on adjacent carbon atoms taken together with the carbon atoms to which they are attached, are polymethylene of 3 to 5 carbon atoms.

2. A compound according to claim 1 wherein $R^1$, $R^2$, $R^3$, $R^4$ and $R^5$ taken independently of each other are each hydrogen, halogeno, hydroxy, trifluoromethyl, cyano, nitro, lower alkyl, lower alkoxy, lower alkylthio, cycloalkyl of 5 to 7 carbon atoms, cycloalkenyl of 5 to 7 carbon atoms, di(lower alkyl)amino, lower alkylcarbonyl, lower alkylcarbonylamino, lower alkylsulfonyl or carbo (lower alkoxy).

3. A compound according to claim 1 wherein any two of $R^1$, $R^2$, $R^3$, $R^4$ and $R^5$ on adjacent carbon atoms when taken together with the carbon atoms to which they are attached are polymethylene of 3 to 5 carbon atoms.

4. The compound according to claim 1 which is 3,4,5-triphenylthiazolone-(2).

5. The compound according to claim 1 which is 3-(p-tolyl)-4,5-diphenylthiazolone-(2).

6. The compound according to claim 1 which is 3-(o-tolyl)-4,5-diphenylthiazolone-(2).

7. The compound according to claim 1 which is 3-(p-tert.-butylphenyl)-4,5-diphenylthiazolone-(2).

8. The compound according to claim 1 which is 2-[β-(5',6',7',8' - tetrahydronaphthyl)] - 4,5 - diphenylthiazolone-(2).

9. The compound according to claim 1 which is 3-(p-cyclohexylphenyl)-4,5-diphenylthiazolone-(2).

10. The compound according to claim 1 which is 3-(p-cyclohexen-1-ylphenyl)-4,5-diphenylthiazolone-(2).

11. The compound according to claim 1 which is 3-(p-nitrophenyl)-4,5-diphenylthiazolone-(2).

12. The compound according to claim 1 which is 3-(m-nitrophenyl)-4,5-diphenylthiazolone-(2).

13. The compound according to claim 1 which is 3-(m-trifluoromethylphenyl)-4,5-diphenylthiazolone-(2).

14. The compound according to claim 1 which is 2-(p-methoxyphenyl)-4,5-diphenylthiazolone-(2).

15. The compound according to claim 1 which is 3-(m-methoxyphenyl)-4,5-diphenylthiazolone-(2).

16. The compound according to claim 1 which is 3-(p-methylthiophenyl)-4,5-diphenylthiazolone-(2).

17. The compound according to claim 1 which is 3-(p-dimethylaminophenyl)-4,5-diphenylthiazolone-(2).

18. The compound according to claim 1 which is 3-(p-acetylphenyl)-4,5-diphenylthiazolone-(2).

19. The compound according to claim 1 which is 3-(p-methylsulfonylphenyl)-4,5-diphenylthiazolone-(2).

20. The compound according to claim 1 which is 3-(p-carboethoxyphenyl)-4,5-diphenylthiazolone-(2).

21. The compound according to claim 1 which is 3-(3'4'-dichlorophenyl)-4,5-diphenylthiazolone-(2).

22. The compound according to claim 1 which is 3-(3'-chloro-4'-trifluoromethylphenyl) - 4,5 - diphenylthiazolone-(2).

23. The compound according to claim 1 which is 3-(3',4'-dicyanophenyl)-4,5-diphenylthiazolone-(2).

24. The compound according to claim 1 which is 3-(3'-methoxy-4-methylphenyl)-4,5-diphenylthiazolone-(2).

25. The compound according to claim 1 which is 3-(2',4',5'-trimethylphenyl)-4,5-diphenylthiazolone-(2).

26. The compound according to claim 1 which is 3-(2'-methyl-3',4'-dichlorophenyl)-4,5-diphenylthiazolone-(2).

27. The compound according to claim 1 which is 3-(p-hydroxyphenyl)-4,5-diphenylthiazolone-(2).

28. The compound according to claim 1 which is 3-(2'-methyl-5'-acetamidophenyl)-4,5-diphenylthiazolone-(2).

29. The compound according to claim 1 which is 3-(2'-methyl-4'-methoxyphenyl)-4,5-diphenylthiazolone-(2).

No references cited.

RICHARD J. GALLAGHER, Primary Examiner

U.S. Cl. X.R.

260—454, 455 A